United States Patent
Murakami et al.

(10) Patent No.: US 6,711,487 B2
(45) Date of Patent: Mar. 23, 2004

(54) POWER DISTRIBUTION CONTROL APPARATUS FOR FOUR-WHEEL DRIVE VEHICLE

(75) Inventors: Tsuyoshi Murakami, Kariya (JP); Hideshi Hiruta, Hiroshima-ken (JP); Hisao Fumoto, Hiroshima-ken (JP); Hiroshi Takagi, Hiroshima-ken (JP)

(73) Assignees: Toyoda Koki Kabushiki Kaisha, Kariya (JP); Mazda Motor Corporation, Aki-gun (JP)

( * ) Notice: Subject to any disclaimer, the term of this patent is extended or adjusted under 35 U.S.C. 154(b) by 0 days.

(21) Appl. No.: 10/284,330

(22) Filed: Oct. 31, 2002

(65) Prior Publication Data

US 2003/0109978 A1 Jun. 12, 2003

(30) Foreign Application Priority Data

Oct. 31, 2001 (JP) .................................. 2001-333713

(51) Int. Cl.[7] ........................ B60K 23/08; B60K 17/35; G06F 19/00
(52) U.S. Cl. ........................ 701/69; 701/89; 180/248
(58) Field of Search .................... 701/69, 89; 180/197, 180/248

(56) References Cited

U.S. PATENT DOCUMENTS

| | | | | | |
|---|---|---|---|---|---|
| 5,752,211 | A | * | 5/1998 | Takasaki et al. | ............... 701/69 |
| 6,213,242 | B1 | * | 4/2001 | Rodrigues et al. | ........... 180/249 |
| 6,219,609 | B1 | * | 4/2001 | Matsuno et al. | ............... 701/72 |
| 6,343,470 | B1 | * | 2/2002 | Nanri et al. | ................... 60/448 |

FOREIGN PATENT DOCUMENTS

JP     2000-85393     3/2000

* cited by examiner

*Primary Examiner*—Michael J. Zanelli
(74) *Attorney, Agent, or Firm*—Oblon, Spivak, McClelland, Maier & Neustadt, P.C.

(57) ABSTRACT

A four-wheel drive vehicle includes a coupling, which varies the distribution ratio of torque to the front wheels and the rear wheels. The distribution ratio of torque to the front wheels and the rear wheels is determined by the engaging force of the coupling. An ECU sets first to third determination threshold values for the opening degree of a throttle valve of an engine in accordance with the detected vehicle speed. The ECU determines whether the vehicle is in a steady driving state by comparing the detected throttle opening degree with the set first to third determination threshold values and controls the engaging force of the coupling in accordance with the determination result. Thus, the steady driving state of the vehicle is correctly determined.

18 Claims, 4 Drawing Sheets

POWER DISTRIBUTION CONTROL APPARATUS FOR FOUR-WHEEL DRIVE VEHICLE

BACKGROUND OF THE INVENTION

The present invention relates to a power distribution control apparatus for a four-wheel drive vehicle.

Systems adopted in typical four-wheel drive vehicles include a part-time four-wheel drive system, in which four-wheel drive (4WD) and two-wheel drive (2WD) are switched, and a full-time four-wheel drive system, in which all four wheels are constantly driven. Generally, the part-time four-wheel drive system allows a driver to manually switch the driving mode to the four-wheel drive to directly couple the front and rear wheels. The full-time four-wheel drive system has a center differential between the front and rear wheels, which permits the front and rear wheels to travel at different rates to achieve permanent four-wheel drive.

In addition to the part-time and full-time four-wheel drive systems, a stand-by four-wheel drive system is known. The stand-by four-wheel drive system shifts the driving mode between the four-wheel drive and the two-wheel drive on demand. The stand-by four-wheel drive system includes main drive wheels, which are directly coupled with an internal combustion engine, and sub drive wheels, which are coupled with the internal combustion engine with a coupling. Distribution of power to the sub drive wheels is optimized by changing the engaging force of the coupling in accordance with the road condition and the driving condition.

A power distribution control apparatus of a stand-by four-wheel drive vehicle compares the opening degree of a throttle located in an internal combustion engine, the differential rotation speed between the front and rear wheels (difference between the wheel speed of the front and rear wheels), and variation in the wheel speed of four-wheels (variation of the wheel speed per unit of time) with determination threshold values. If each of the opening degree of the throttle, the differential rotation speed, and the variation of the wheel speed is less than or equal to the corresponding determination threshold value, the power distribution control apparatus determines that the vehicle is in a steady driving state. If it is determined that the vehicle is in the steady driving state, the power distribution control apparatus controls a coupling to reduce distribution of the power to the sub drive wheels (front or rear wheels).

As a result, when it is determined that the vehicle is in the steady driving state, power need not be applied to the sub drive wheels. When power is not applied to the sub drive wheels, transmission loss at, for example, the coupling and the differential gear of the sub-drive wheels is eliminated, which reduces the fuel consumption.

However, in the conventional stand-by four-wheel drive vehicle, the power distribution control apparatus determines that the vehicle is in the steady driving state when the throttle opening is less than or equal to a predetermined determination threshold value regardless of the vehicle speed.

Therefore, if the determination threshold value of the throttle opening is set corresponding to a middle speed range (for example, 40 km/h to 70 km/h) that require high response for stable steering, the steady driving state at a high speed range (for example, 100 km/h) is not easily determined. That is, in this case, the throttle opening in the high speed range is greater than that in the middle speed range. Thus, although the vehicle is in the steady driving state in the high speed range, the throttle opening is greater than or equal to the determination threshold value, which is set corresponding to the middle speed range. Therefore, it is determined that the vehicle is not in the steady driving state.

If a certain determination threshold value of the throttle opening degree is determined regardless of the vehicle speed, it is determined that the vehicle is in the steady driving state when the vehicle is driving at high speed on a flat road. However, in this case, when the vehicle is in the steady driving state on a gentle slope, it is not determined that the vehicle is in the steady driving state, and the determination of the steady driving state is cancelled.

Therefore, in this case, the vehicle is driven by four-wheel drive, which deteriorates fuel consumption.

SUMMARY OF THE INVENTION

Accordingly, it is an objective of the present invention to provide a power distribution control apparatus for a four-wheel drive vehicle that correctly determines whether the vehicle is in a steady driving state.

To achieve the above objective, the present invention provides a power distribution control apparatus for a four-wheel drive vehicle. The vehicle has front wheels and rear wheels driven by an engine and a coupling for changing the distribution ratio of torque to the front wheels and the rear wheels. The distribution ratio of torque to the front wheels and the rear wheels is determined by the engaging force of the coupling. The apparatus includes vehicle speed detecting means, a throttle opening degree sensor, and a controller. The vehicle speed detecting means detects the speed of the vehicle. The throttle opening degree sensor detects the throttle opening degree, which is the opening degree of a throttle valve located in the engine. The controller controls the coupling. The controller sets at least one determination threshold value for the throttle opening degree in accordance with the detected vehicle speed, determines the driving state of the vehicle by comparing the detected throttle opening degree with the set determination threshold value, and controls the engaging force of the coupling in accordance with the determined driving state.

The present invention also provides a power distribution controlling method for a four-wheel drive vehicle. The vehicle has front wheels and rear wheels driven by an engine and a coupling for changing the distribution ratio of torque to the front wheels and the rear wheels. The distribution ratio of torque to the front wheels and the rear wheels is determined by the engaging force of the coupling. The method includes: detecting the speed of the vehicle; detecting the throttle opening degree, which is the opening degree of a throttle valve located in the engine; setting at least one determination threshold value for the throttle opening degree in accordance with the detected vehicle speed; determining the driving state of the vehicle by comparing the detected throttle opening degree with the set determination threshold value; and controlling the engaging force of the coupling in accordance with the determined driving state.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A four-wheel drive vehicle 11 according to a preferred embodiment of the present invention will now be described with reference to FIGS. 1 to 5.

Figure 1:
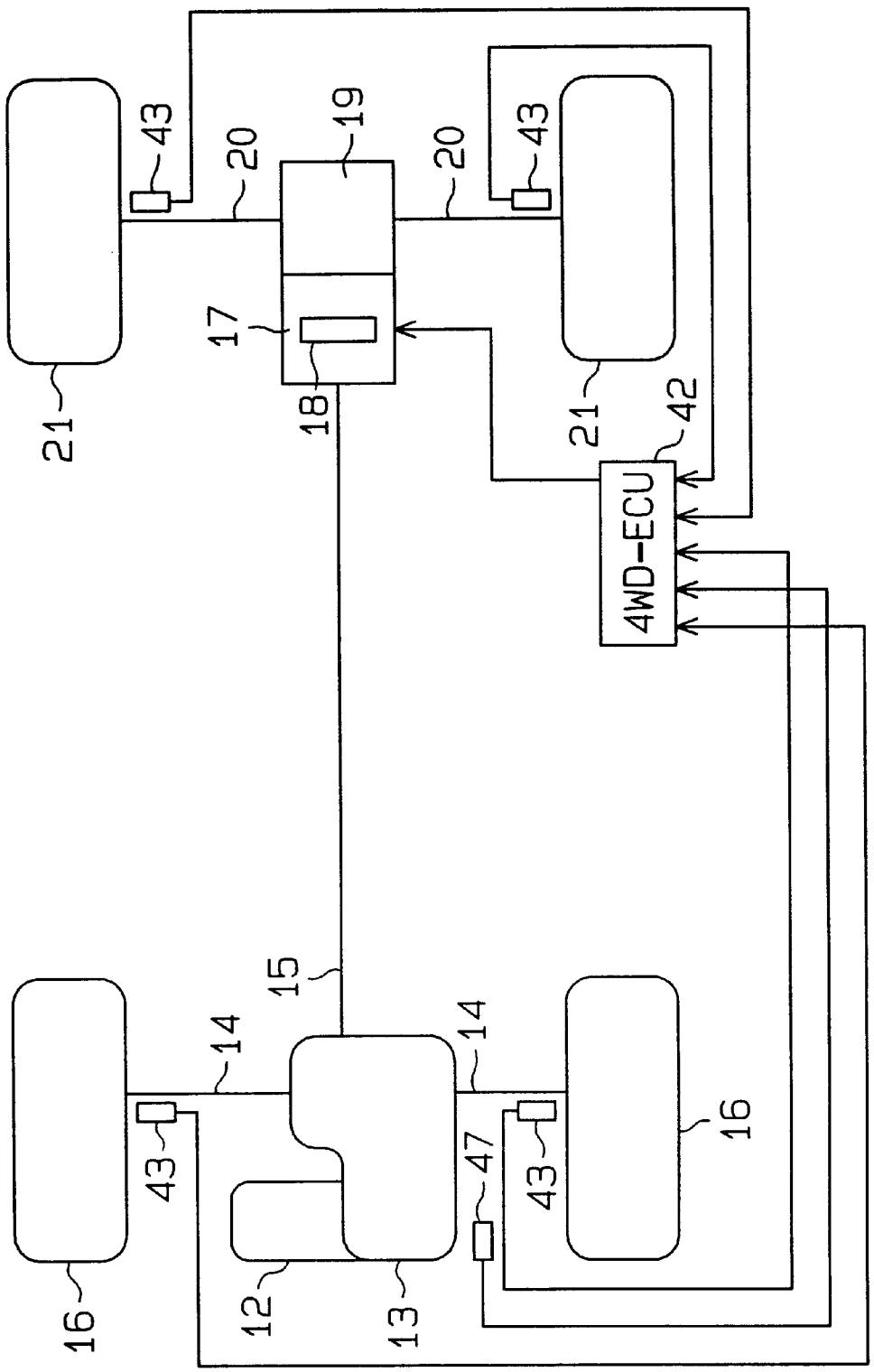
FIG. 1 is a schematic diagram illustrating a four-wheel drive vehicle according to a preferred embodiment of the present invention.

As shown in FIG. 1, the four-wheel drive vehicle 11 has an internal combustion engine, which is an engine 12 in this embodiment, and a transaxle 13. The transaxle 13 includes, for example, a transmission and a transfer, which are not shown. The transaxle 13 is coupled with a pair of front axles 14 and a propeller shaft 15. The front axles 14 are coupled with front wheels 16. The propeller shaft 15 is coupled with a power transmitting device, which is a coupling 17, in this embodiment. The coupling 17 is coupled with a rear differential 19 with a drive pinion shaft (not shown). The rear differential 19 is coupled with rear wheels 21 by a pair of rear axles 20.

Power of the engine 12 is transmitted to the front wheels 16 by the transaxle 13 and the front axles 14. When the propeller shaft 15 is coupled with the drive pinion shaft by the coupling 17 to transmit the torque, the power of the engine 12 is transmitted to the rear wheels 21 by the propeller shaft 15, the drive pinion shaft, the rear differential 19, and the rear axles 20.

The coupling 17 includes an electromagnetic clutch mechanism 18, which is a multiple disk hydraulic wet clutch. The electromagnetic clutch 18 has clutch plates (not shown), which are selectively engaged by friction and separates from each other. Current is supplied to an electromagnetic coil (not shown), which is embedded in the electromagnetic clutch mechanism 18, in accordance with a current command value. At this time, the clutch plates frictionally engage with each other and torque is transmitted between the front and rear wheels 16, 21. When no current is supplied to the electromagnetic clutch mechanism 18, the clutch plates separate from each other and prevents transmission of torque between the front and rear wheels 16, 21.

The degree of frictional engagement of each clutch plate increases or decreases in accordance with the amount, or intensity, of current supplied to the electromagnetic coil of the electromagnetic clutch mechanism 18. Accordingly, the transmission of torque between the front and rear wheels 16, 21, that is, the fixing force between the front and rear wheels 16, 21 (the degree of frictional engagement of the electromagnetic clutch mechanism 18) is adjusted. Current supply to the electromagnetic coil of the electromagnetic clutch mechanism 18 is controlled by a power distribution controller, which is an electronic control unit (ECU) 42 in this embodiment. The ECU 42 will be described later. In other words, the ECU 42 selects either of the four-wheel drive and the second-wheel drive, and controls the distribution ratio of power, or the distribution ratio of torque, between the front and rear wheels 16, 21 when the vehicle is in the four-wheel drive mode.

In the FF (two-wheel drive) mode, the torque transmission of the electromagnetic clutch mechanism 18 is stopped and the distribution ratio of torque of the front wheels to the rear wheels is 100:0. When the electromagnetic clutch mechanism 18 is engaged by half the torque of the engine torque or more, the distribution ratio of torque of the front wheels to the rear wheels is 50:50, or the torque distribution between the front and rear wheels 16, 21 is equalized (hereinafter, referred to as a complete four-wheel drive). The distribution ratio of torque transmitted to the front wheels 16 and the rear wheels 21 is varied by the command from the ECU 42 within the range the distribution ratio of torque of the front wheels to the rear wheels is 100–50:0–50.

The electric configuration of the four-wheel drive vehicle 11 will now be described.

Figure 2:
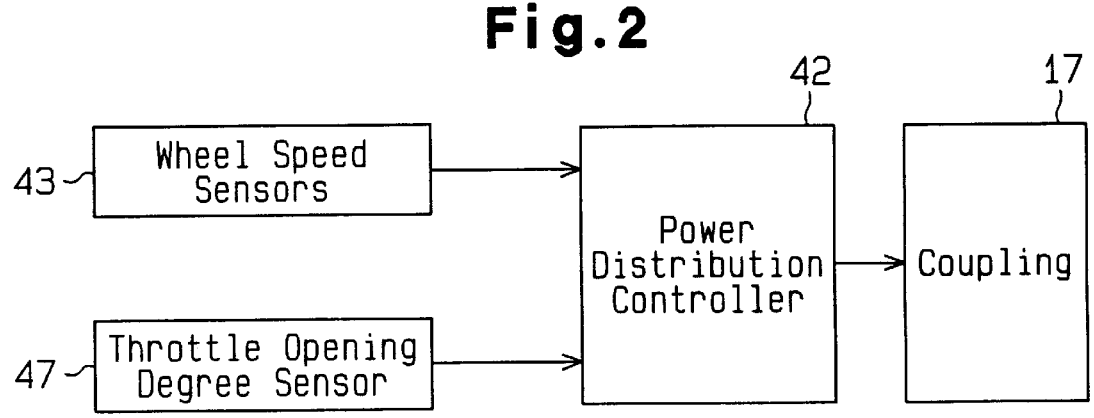
FIG. 2 is an electric block diagram showing the four-wheel drive vehicle according to the preferred embodiment.

As shown in FIG. 2, the four-wheel drive vehicle 11 has the ECU 42.

The ECU 42 is mainly formed of a microcomputer, which includes, for example, a CPU, a RAM, a ROM, and an I/O interface. The ROM stores several types of control programs that the ECU 42 executes and several types of data and maps. The maps are obtained by, for example, experimental data of a vehicular model and conventional theoretical calculations. The RAM is a working area where the CPU of the ECU 42 deploys the control programs stored in the ROM and executes several computing processes.

The input of the ECU 42, or the input terminal of the I/O interface, is connected to wheel speed sensors 43 and a throttle opening degree sensor 47.

The output of the ECU 42, or the output terminal of the I/O interface, is connected to the coupling 17 and an engine controller, which is not shown.

Each wheel speed sensor 43 is located on one of the front and rear wheels 16, 21 to detect the speed of the corresponding wheel 16 or 21 (hereinafter, referred to as the wheel speed). The throttle opening degree sensor 47 is connected to a throttle valve (not shown) to detect the opening degree of the throttle valve, or the depression amount of an acceleration pedal (not shown) when a driver steps on the pedal.

The ECU 42 determines whether the vehicle is in a steady driving state in accordance with detection signals from the sensors 43, 47 and controls the distribution amount of power to the front wheels and the rear wheels by adjusting the amount of current supplied to the electromagnetic coil of the electromagnetic clutch mechanism 18 in accordance with the current command value.

Figure 4:
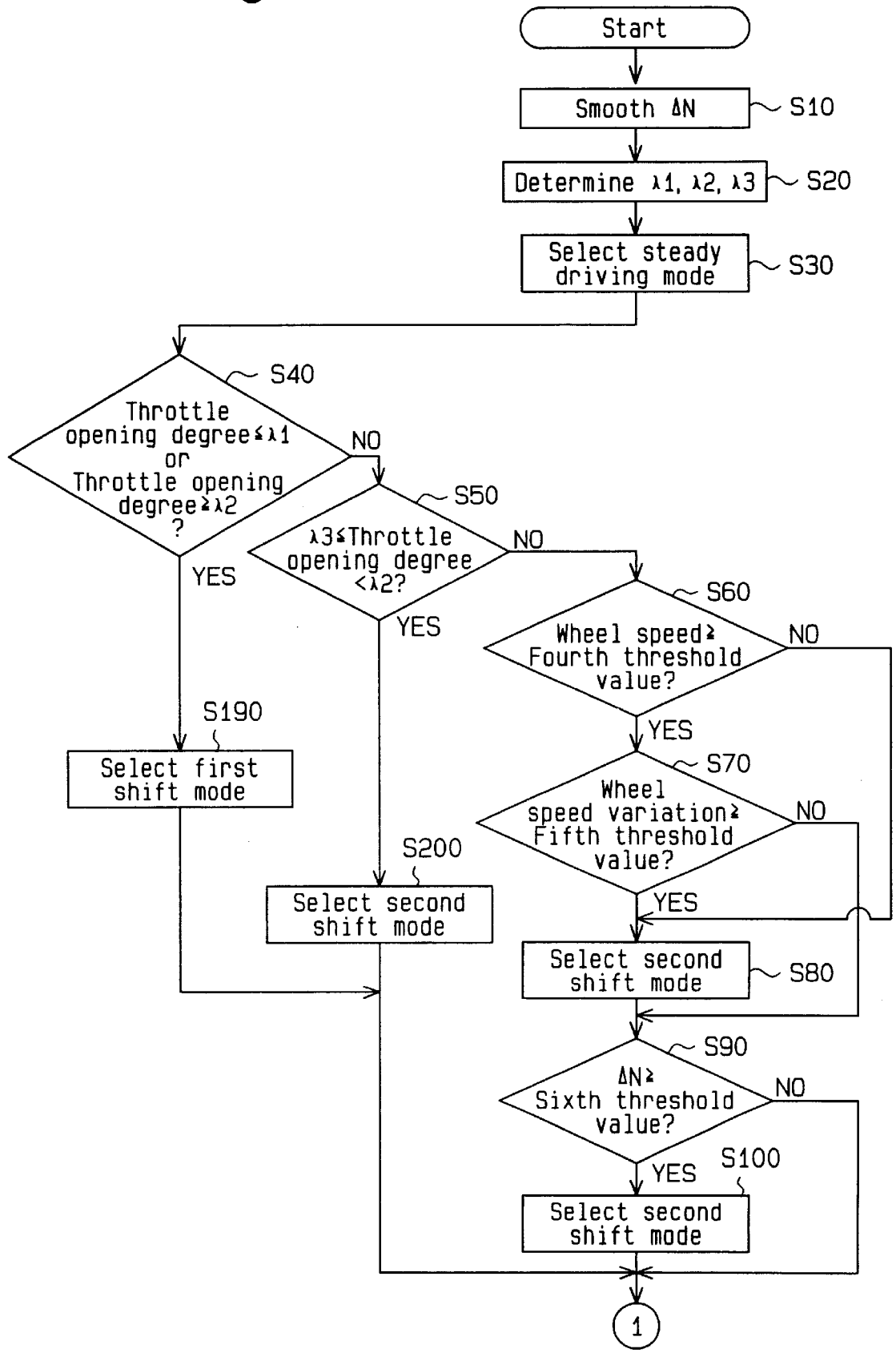
FIG. 4 is a flowchart of the steady driving state determining control according to the preferred embodiment.
Figure 5:
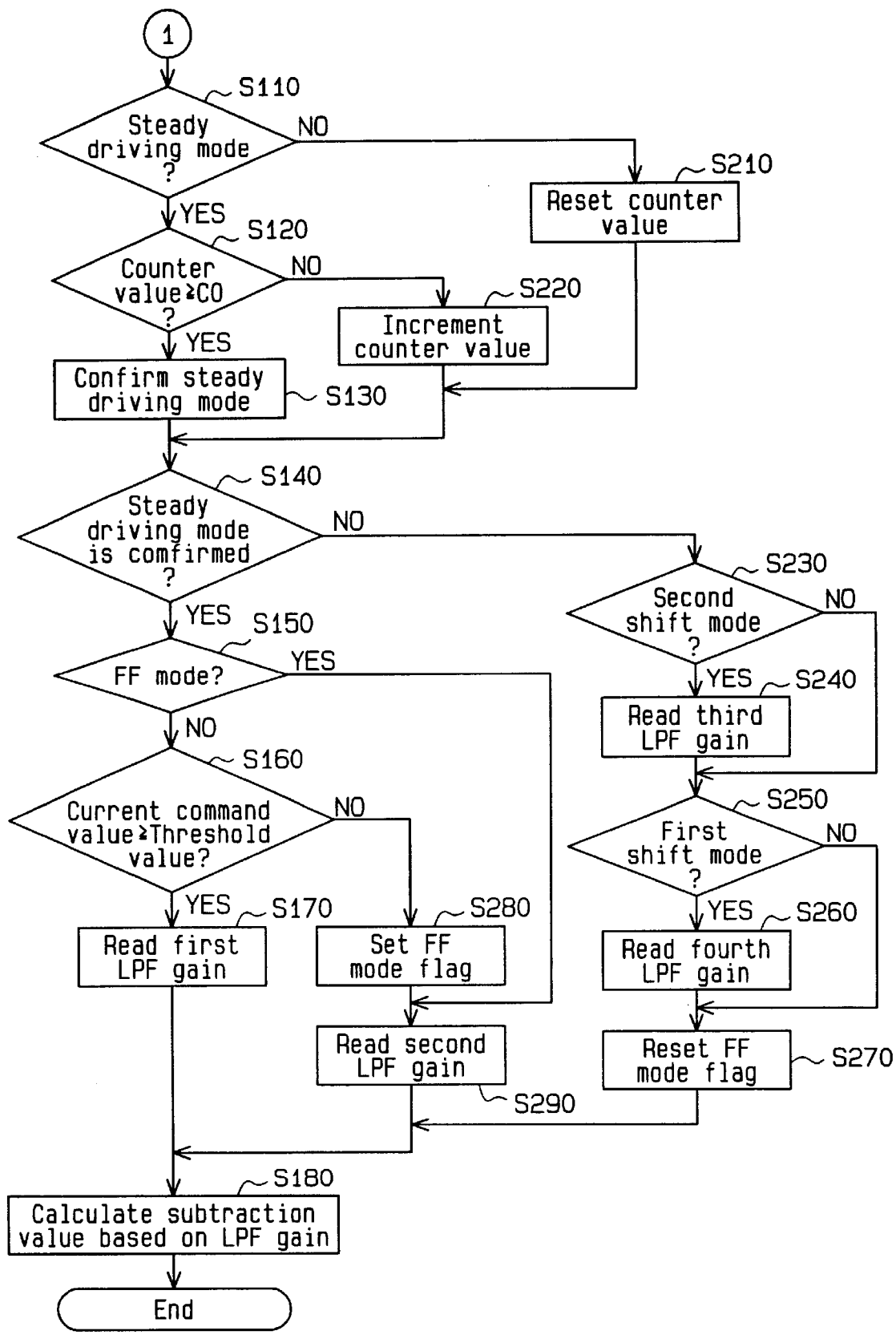
FIG. 5 is a flow chart illustrating later stages of the routine in FIG. 4.

The operations of the ECU 42 of the four-wheel drive vehicle will now be described with reference to FIGS. 3 to 5. FIGS. 4 and 5 are flowcharts of a steady driving state determining control program executed by the ECU 42.

In the preferred embodiment, the ECU 42 determines several modes based on detection values sent from several sensors and executes control programs for several modes in accordance with the determination result apart from the steady driving state determining control program.

In the preferred embodiment, assume that a straight advance mode control program is executed at a predetermined computing cycle in advance to calculate the current command value used in the straight advance mode. The explanation of the process for determining the straight advance mode is omitted since the process is disclosed in Japanese Laid-Open Patent Publication 2000-85393. The calculation of the current command value used in the straight advance mode is also known but will be briefly explained.

The ECU 42 reads the wheel speed of each front wheel 16 and each rear wheel 21 from the corresponding wheel speed sensor 43. The ECU 42 then computes the difference ΔN (hereinafter, referred to as the wheel speed difference) between the average wheel speed of the front wheels 16 and the average wheel speed of the rear wheels 21. The ECU 42 obtains the degree of frictional engagement of the electromagnetic clutch mechanism 18 by using a map, which is not shown, in accordance with the wheel speed difference ΔN. Consequently, the ECU 42 calculates the vehicle speed V based on the average value of wheel speed of the rear wheels 21, which are the sub drive wheels and have small amount of wheel slip.

The ECU 42 obtains a first correction coefficient of the degree of frictional engagement of the electromagnetic clutch mechanism 18 by using a map, which is not shown, in accordance with the vehicle speed V. In this case, the first correction coefficient is obtained to increase the degree of frictional engagement when the vehicle speed V is low to improve the driving stability, and to decrease the degree of frictional engagement when the vehicle speed V is high to improve the steering performance.

The ECU 42 obtains a second correction coefficient of the degree of frictional engagement of the electromagnetic clutch mechanism 18 by using a map, which is not shown, in accordance with the throttle opening degree. The second correction coefficient is obtained to increase the degree of frictional engagement when the throttle opening degree is increased to improve the starting performance and the acceleration performance.

Based on the first and second correction coefficients, the ECU 42 determines the degree of frictional engagement of the electromagnetic clutch mechanism 18 in the straight advance mode. The ECU 42 determines the current command value in accordance with the degree of frictional engagement. The maps are stored in the ROM in advance.

The flowchart of the steady driving state determining control program will now be described.

The control program is executed every predetermined control cycle.

As shown in FIG. 4, in step S10, the ECU 42 smoothes the wheel speed difference ΔN. In the preferred embodiment, the smoothing process is performed by a low pass filter. However, the average value including values computed in advance may be calculated to smooth the difference ΔN.

In step S20, the ECU 42 determines threshold values of the throttle opening degree. More specifically, the ECU 42 computes the vehicle speed V. The vehicle speed V is calculated based on the average value of the wheel speed of the rear wheels 21, which are the sub drive wheels and have small amount of wheel slip. Then, the ECU 42 selects first to third determination threshold values $\lambda 1$ to $\lambda 3$ ($\lambda 1 < \lambda 3 < \lambda 2$) with reference to a two-dimensional map (threshold value setting map), which includes the actual vehicle speed V and the throttle opening degree as shown in FIG. 3. The map is stored in the ROM in advance.

Figure 3:
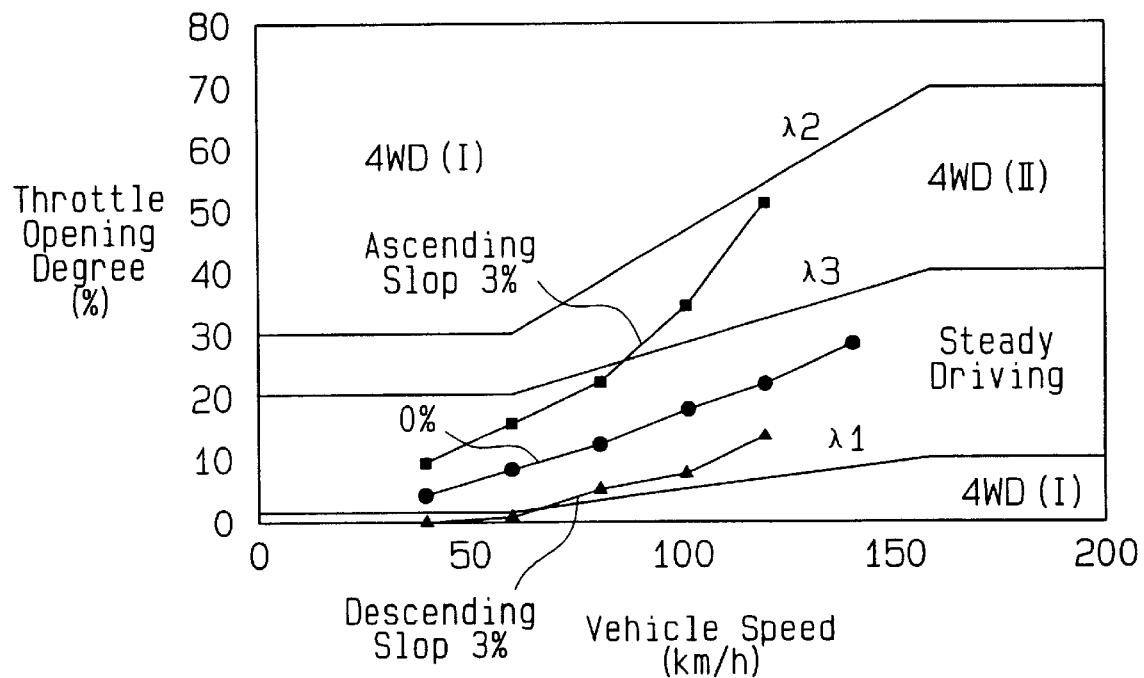
FIG. 3 is a diagram showing a two-dimensional map of the vehicle speed and determination threshold values used in a steady driving state determining control program according to the preferred embodiment.

When the first to third determination threshold values $\lambda 1$, $\lambda 2$, and $\lambda 3$ are compared under the same vehicle speed V, the values $\lambda 1$, $\lambda 2$, and $\lambda 3$ satisfy the inequality $\lambda 1 < \lambda 2 < \lambda 3$ as shown in the map of FIG. 3. The first to third determination threshold values $\lambda 1$ to $\lambda 3$ are constant values when the vehicle is in a low speed range (0 to 60 km/h in this embodiment). The first to third determination threshold values $\lambda 1$ to $\lambda 3$ increase linearly as the vehicle speed V increases when the vehicle is in a middle speed range (60 to 160 km/h in this embodiment). Further, the first to third determination threshold values $\lambda 1$ to $\lambda 3$ are constant values when the vehicle is in a high speed range (160 km/h or more in this embodiment).

In step S30, the ECU 42 selects a steady driving mode.

In step 40, the ECU 42 determines whether the current throttle opening degree detected by the throttle opening degree sensor 47 is less than or equal to the first determination threshold value $\lambda 1$ or greater than or equal to the second determination threshold value $\lambda 2$.

If it is determined that the throttle opening degree is less than or equal to the first determination threshold value $\lambda 1$ or greater than or equal to the second determination threshold value $\lambda 2$, the decision outcome of step S40 is positive and the ECU 42 proceeds to step S190. In step S190, the ECU 42 selects a first shift mode and proceeds to step S110. The first shift mode is a mode to relatively rapidly increase the distribution ratio of torque to the rear wheels 21. In other words, the first shift mode is a mode to relatively rapidly decrease the distribution ratio of torque to the front wheels 16.

In step S40 the ECU 42 determines whether the driver is depressing the acceleration pedal by a great degree or releasing the acceleration pedal to decelerate. If the driver is depressing the acceleration pedal by a great degree or releasing the acceleration pedal, the ECU 42 determines that the vehicle is not in the steady driving state.

If it is determined that the throttle opening degree exceeds the first determination threshold value $\lambda 1$ or less than the second determination threshold value $\lambda 2$, the decision outcome of step S40 is negative, and the ECU 42 proceeds to step S50.

In step S50, the ECU 42 determines whether the throttle opening degree is greater than or equal to the third determination threshold value $\lambda 3$ and less than the second determination threshold value $\lambda 2$.

In a case when the driver depresses the acceleration pedal on a gentle slope and the vehicle speed is constant, the vehicle is preferably driven in two-wheel drive when the vehicle speed is less than a predetermined value, and is preferably driven in four-wheel driven when the vehicle speed is greater than or equal to a predetermined vehicle speed.

If it is determined that the throttle opening degree is greater than or equal to the third determination threshold value $\lambda 3$ and less than the second determination threshold value $\lambda 2$, the decision outcome of step S50 is positive and the ECU 42 proceeds to step S200. In step S200, the ECU 42 selects a second shift mode and proceeds to step S110. The second shift mode is a mode to relatively slowly increase the distribution ratio of torque to the rear wheels 21. In other words, the second shift mode is a mode to relatively slowly decrease the distribution ratio of torque to the front wheels 16. If it is determined that the throttle opening degree does not satisfy the conditions defined in step S50, the decision outcome of step S50 is negative and the ECU 42 proceeds to step S60.

In step S60, the ECU 42 determines whether the wheel speed of any of the four wheels is greater than or equal to a predetermined fourth determination threshold value. The fourth determination threshold value is stored in the ROM in advance. In step S60, the ECU 42 determines that the vehicle is in the steady driving state only when the wheel speed of any of the four wheels is greater than or equal to the fourth determination threshold value.

If it is determined that the wheel speed of any of the four wheels is greater than or equal to the fourth determination threshold value, the ECU 42 proceeds to step S70. If it is determined that the condition of step S60 is not satisfied, the ECU 42 proceeds to step S80.

In step S70, the ECU 42 determines whether variation of the wheel speed of any of the four wheels per second is greater than or equal to a fifth determination threshold value. The fifth determination threshold value is stored in the ROM in advance. In step S70, the ECU 42 determines whether the vehicle speed is increasing or decreasing since the vehicle is ascending or descending a slope although the throttle opening degree is constant. That is, the ECU 42 detects variation of the wheel speed. This is because when the wheel speed is greater than the fourth determination threshold value and fluctuating, the vehicle is preferably driven in four-wheel drive rather than two-wheel drive for stabilizing the vehicle.

In step S70, if it is determined that variation of the wheel speed of any of the four wheels per second is greater than or equal to the fifth determination threshold value, the decision outcome of step S70 is positive and the ECU 42 proceeds to step S80. If the condition of step S70 is not satisfied, the ECU 42 proceeds to step S90.

In step S80, the ECU 42 selects the second shift mode instead of the steady driving mode selected in step S30. In step S80, the drive mode is changed although the driver does not depress the acceleration pedal rapidly or by a great degree. That is, the negative decision in step S60 and the positive decision in step S70 are made regardless of the driver's intention. Therefore, in step S80, the ECU 42 selects the second shift mode to relatively slowly increase the distribution ratio of torque to the rear wheels 21. Thus, the driver does not feel uncomfortable. If the first shift mode is selected, the distribution ratio of torque suddenly changes regardless of the driver's intention. Thus, the driver feels uncomfortable.

In step S90, the ECU 42 determines whether the wheel speed difference ΔN is greater than or equal to a sixth determination threshold value. The sixth determination threshold value is stored in the ROM in advance.

In step S90, it is determined whether either of the front and rear wheels are slipping by detecting the wheel speed difference ΔN.

The determination steps other than step S90 assume that the vehicle is driving on a dry road or an irregular road. On the other hand, step S90 assumes that the vehicle is driving on, for example, a flat but icy road. In this case, variation of the wheel speed is small, but the front wheels 16 slip if only the front wheels 16 are driven. In this case, the front wheels 16 keep slipping. Thus, the ECU 42 determines whether the front wheels 16 are slipping and if it is determined that the front wheels 16 are slipping, the ECU 42 increases the distribution ratio of torque to the rear wheels 21.

In step S90, if it is determined that the wheel speed difference ΔN is greater than or equal to the sixth determination threshold value, the decision outcome of step S90 is positive and the ECU 42 proceeds to step S100. If the condition of step S90 is not satisfied, the ECU 42 proceeds to step S110 of FIG. 5.

In step S100, the ECU 42 selects the second shift mode instead of the steady driving mode selected in step S30 for the same reason as step S80.

As shown in FIG. 5, in step S110, the ECU 42 determines whether the steady driving mode is being selected. If the driving mode is changed from the steady driving mode selected in step S30 to the shift mode in S80, S100, S190, or S200, the decision outcome of step S110 is negative and the ECU 42 proceeds to step S210. In step S210, the ECU 42 resets a counter and proceeds to step S140.

If the ECU 42 has not been through the steps S80, S100, S190, and S200, the steady driving mode is still selected. Thus, the decision outcome of step S110 is positive and the ECU 42 proceeds to step S120.

Steps S120 and S220 are executed to determine whether time required for confirming the steady driving mode has elapsed.

In step S120, the ECU 42 determines whether the counter value is greater than or equal to a predetermined value C0. If it is determined that the counter value is greater than or equal to the predetermined value C0 in step S120, the ECU 42 proceeds to step S130 and confirms the steady driving mode selected in step S30. If it is not determined that the counter value is greater than or equal to the predetermined value C0, the decision outcome of step S120 is negative, and the ECU 42 proceeds to step S220. In step S220, the ECU 42 increments the counter value by one and proceeds to step S140.

The control program of FIGS. 4 and 5 is executed every predetermined control cycle t. Therefore, the decision outcome of step S120 is positive only when the steady driving mode is selected for a predetermined time (predetermined value C0×control cycle t). As a result, the ECU 42 confirms the steady driving mode in step S130. Thus, the ECU 42 confirms the steady driving mode only when the vehicle travels for a certain period while the steady driving state is maintained. That is, when the vehicle is in the steady driving state momentarily, the steady driving mode is not confirmed. The predetermined value C0 is stored in the ROM.

In step S140, the ECU 42 determines whether the steady driving mode is confirmed. If the ECU 42 proceeds to step S140 from step S130, the decision outcome of step S140 is positive and the ECU 42 further proceeds to step S150. If the ECU 42 proceeds to S140 from step S210 or from step S220, the decision outcome of step S140 is negative and the ECU 42 proceeds to step S230.

In step S150, the ECU 42 determines whether the vehicle is in an FF (two-wheel drive) mode based on an FF mode flag. If an FF mode flag is set to the FF mode, the ECU 42 proceeds to step S290 and executes a process for the FF mode. That is, the ECU 42 reads an LPF (low pass filter) gain for the FF mode and proceeds to step S180.

However, if the FF mode flag is not set, the ECU 42 proceeds to step S160.

In step S160, the ECU 42 determines whether the actual current command value is greater than or equal to a predetermined threshold value. The current command value is the most updated value that the ECU 42 sends to the electromagnetic coil of the electromagnetic clutch mechanism 18 during the above-mentioned straight advance mode.

If the FF mode flag is not set, the current command value is set to a value that permits the torque transmission to the rear wheels 21. That is, the current command value is set to a value that changes the driving mode to the 4WD mode. If the FF mode flag is not set when it is determined that the steady driving mode is confirmed, the current command value gradually decreases each time the control program is performed. That is, the ECU 42 decreases the current command value to gradually decrease the degree of frictional engagement of the electromagnetic clutch mechanism 18, which gradually decreases the distribution ratio of torque to the rear wheels 21.

In step S160, if it is determined that the actual current command value is greater than or equal to the threshold value, the ECU 42 proceeds to step S170.

That is, when the actual current command value is greater than or equal to the threshold value, the ECU 42 determines that the vehicle is in the process of gradually decreasing the distribution ratio of torque to the rear wheels 21. In step S170, the ECU 42 reads a first LPF gain, which is the gain of the low pass filter for the steady driving mode, from the ROM and proceeds to step S180. In step S180, the ECU 42 calculates the subtraction value based on the first LPF gain. The ECU 42 then subtracts the subtraction value from the actual current command value, and sets the obtained value as the most updated current command value. Then, the ECU 42 temporarily terminates the routine. That is, the current command value is updated by subtracting the subtraction value from the actual current command value.

When executing the control program for the first time, the initial value 0 is used as the subtraction value.

In step 160, if the actual current command value is less than the threshold value, the ECU 42 determines that the torque transmitted to the rear wheels 21 is close to zero. In other words, the ECU 42 determines that the torque transmitted to the rear wheels 21 has reached the target value for the FF mode. Then, the ECU 42 proceeds to step S280. In step S280, the ECU 42 sets the FF mode flag.

In step S290, the ECU 42 reads a second LPF gain, which is the gain of the low pass filter for the FF mode, from the ROM and proceeds to step S180. In step S180, the ECU 42 calculates the subtraction value based on the second LPF gain. The ECU 42 then subtracts the subtraction value from the actual current command value, and sets the obtained value as the most updated current command value. Then, the ECU 42 temporarily terminates the routine.

The subtraction value calculated based on the second LPF gain is zero. Thus, when the ECU 42 shifts from step S290 to step S180, the actual current command value is set as the most updated current command value. Also, based on the current command value, the electromagnetic clutch mechanism 18 reduces the torque transmitted to the rear wheels 21 to zero so that the distribution ratio of torque between the front wheels 16 and the rear wheels 21 is 100:0.

In step S230, the ECU 42 determines whether the second shift mode is selected. If it is determined that the second shift mode is selected, the ECU 42 proceeds to step S240. In step S240, the ECU 42 reads a third LPF gain, which is the gain of the low pass filter for the second shift mode, from the ROM and proceeds to step S250. If it is determined that the second shift mode is not selected in step S230, the ECU 42 does not perform step S240 and proceeds to step S250.

In step S250, the ECU 42 determines whether the first shift mode is selected. If it is determined that the first shift mode is selected, the ECU 42 proceeds to step S260. In step S260, the ECU 42 reads a fourth LPF gain, which is the gain of the low pass filter for the first shift mode, from the ROM and proceeds to step S270. If it is determined that the first shift mode is not selected in step S250, the ECU 42 does not perform step S260 and proceeds to step S270. In step S270, the ECU 42 resets the FF mode flag and proceeds to step S180.

When the ECU 42 is shifted from step S270 to step S180, a process for increasing the distribution ratio of torque to the rear wheels 21 is performed in step S180. That is, the subtraction value calculated in step S180 based on the third LPF gain obtained in step S240 or the fourth LPF gain obtained in step S260 is a negative value. Therefore, in step S180, the absolute value of the subtraction value is added to the actual current command value to obtain a new current command value. Thus, the current command value is increased by the amount of the subtraction value. The subtraction value based on the fourth LPF gain obtained in step S260 is greater than the subtraction value based on the third LPF gain obtained in step S240. Therefore, when the control program is repeatedly performed, the current command value increases faster, or the distribution ratio of torque to the rear wheels 21 increases faster, when the first shift mode is selected than when the second shift mode is selected.

If the decision outcome of step S230 and step S250 are negative and the ECU 42 proceeds to step S180 via step S270, the low pass filter gain is not obtained. In this case, in step S180, the subtraction value is assumed to be zero and the actual current command value is set as a new current command value. Based on the current command value, the electromagnetic clutch mechanism 18 sets the distribution ratio of torque between the front wheels 16 and the rear wheels 21 to 50:50.

Following is an explanation of the control procedure of the ECU 42 when the vehicle speed and the throttle opening degree are as shown in FIG. 3 while the vehicle is ascending a slope with a gradient of 3%. The plot positions of the vehicle speed are 40, 60, 80, 100, 120, and 140 km/h in any driving state.

In the following explanation, it is assumed that the decision outcome of step S60 is positive, the decision outcome of step S70 is negative, and the decision outcome of step S90 is negative in the flowchart of FIG. 4.

The throttle opening degree is greater than or equal to the first determination threshold value $\lambda 1$ and less than the third determination threshold value $\lambda 3$ when the vehicle speed is within the range of 40 to approximately 80 km/h. Thus, according to the flowchart of FIG. 4, the decision outcome of step S40 and step S50 are negative in this speed range. Therefore, when the steady driving state is maintained until the condition in step S120 is satisfied, the steady driving mode is confirmed.

When the steady driving mode is confirmed, the steps S160 to S180 are repeated every time the routine in FIGS. 4 and 5 is executed in this speed range. As a result, ECU 42 controls the coupling 17 such that the distribution ratio of torque to the rear wheels 21 gradually decreases. The distribution ratio of torque to the rear wheels 21 can eventually become zero.

The throttle opening degree is greater than or equal to the third determination threshold value $\lambda 3$ and less than the second determination threshold value $\lambda 2$ when the vehicle speed is within the range of approximately 80 to 120 km/h. Thus, according to the flowchart of FIG. 4, the decision outcome of step S40 is negative and the decision outcome of step S50 is positive in this speed range.

Thus, the ECU 42 proceeds to step S200 and selects the second shift mode. After selecting the second shift mode, the ECU 42 goes through steps S110, S210, S140, S230, S240, S250, S270, and S180.

Therefore, the ECU 42 controls the coupling 17 such that the distribution ratio of torque to the rear wheels 21 gradually (relatively slowly) increases. The distribution ratio of torque between the front wheels 16 and the rear wheels 21 eventually becomes 50:50.

The control process of the ECU 42 when the vehicle is traveling on a flat road (indicated as 0% in FIG. 3) will now be described.

In the following explanation, it is assumed that the decision outcome of step S60 is positive, the decision outcome of step S70 is negative, and the decision outcome of step S90 is negative in the flowchart of FIG. 4.

In this case, the throttle opening degree is always greater than or equal to the first determination threshold value $\lambda 1$ and less than the third determination threshold value $\lambda 3$ in this speed range (40 to 140 km/h). Thus, the decision outcome of step S40 and step S50 are negative. Therefore, when the above-mentioned driving state is maintained until the condition in step S120 in FIG. 5 is satisfied, the steady driving mode is confirmed.

When the steady driving mode is confirmed, the steps S160 to S180 are repeated every time the routine in FIGS. 4 and 5 is executed in this speed range (40 to 140 km/h). As a result, the ECU 42 controls the coupling 17 such that the distribution ratio of torque to the rear wheels 21 gradually decreases. The distribution ratio of torque to the rear wheels 21 eventually becomes zero.

Following is an explanation of the control procedure of the ECU 42 when the vehicle speed and the throttle opening degree are as shown in FIG. 3 while the vehicle is descending a gentle slope with the gradient of 3%.

The throttle opening degree is less than or equal to the first determination threshold value $\lambda 1$ when the vehicle speed is within 40 to approximately 70 km/h. In this speed range, the decision outcome of step S40 is positive.

Therefore, in step S190, the ECU 42 selects the first shift mode and goes through steps S110, S210, S140, S230, S250, S260, S270, and S180. Therefore, the ECU 42 controls the coupling 17 such that the distribution ratio of torque to the rear wheels 21 gradually (relatively rapidly) increases. The distribution ratio of torque between the front wheels 16 and the rear wheels 21 eventually becomes 50:50.

The control procedure of the ECU 42 when the vehicle is driving at approximately 70 to 120 km/h will now be described.

In the following explanation, it is assumed that the decision outcome of step S60 is positive, the decision outcome of step S70 is negative, and the decision outcome of step S90 is negative in the flowchart of FIG. 4.

The throttle opening degree is greater than or equal to the first determination threshold value $\lambda 1$ and less than the third determination threshold value $\lambda 3$ when the vehicle speed is within the range of approximately 70 to 120 km/h. Thus, the decision outcome of step S40 and step S50 are negative in this speed range. Therefore, when the steady driving state is maintained until the condition in step S120 in FIG. 5 is satisfied, the steady driving mode is confirmed.

When the steady driving mode is confirmed, the steps S160 to S180 are repeated every time the routine in FIGS. 4 and 5 is executed in this speed range. As a result, the ECU 42 controls the coupling 17 such that the distribution ratio of torque to the rear wheels 21 gradually decreases. The distribution ratio of torque to the rear wheels 21 eventually becomes zero.

The preferred embodiment has the following advantages.

The ECU 42 of the preferred embodiment directly transmits the power of the engine 12 to one of the pairs of the front wheels 16 and the rear wheels 21. The ECU 42 transmits the power to the other one of the pairs of the front wheels 16 and the rear wheels 21 through the coupling 17. The ECU 42 controls the degree of the frictional engagement of the coupling 17 in accordance with the driving state of the vehicle.

Further, the wheel speed sensors 43 detect the wheel speed and the ECU 42 calculates the average value of the wheel speed of the rear wheels 21. The vehicle speed is obtained based on the average value. The ECU 42 and the wheel speed sensors 43 form vehicle speed detecting means. The throttle opening degree sensor 47 detects the opening degree of the throttle valve of the engine 12.

The ECU 42 sets the first to third determination threshold values $\lambda 1$, $\lambda 2$, and $\lambda 3$ in accordance with the vehicle speed. The ECU 42 compares the current throttle opening degree with the first to third determination threshold values $\lambda 1$, $\lambda 2$, and $\lambda 3$ to determine the steady driving state. The ECU 42 controls the coupling 17 to adjust the distribution ratio of torque between the front wheels 16 and the rear wheels 21 based on the determination result of the steady driving state.

As a result, in any vehicle speed range, the ECU 42 selects the determination threshold values for the throttle opening degree appropriate for the vehicle speed, and correctly determines the steady driving state.

If it is determined that the vehicle is in the steady driving state, the distribution ratio of torque to the rear wheels 21 decreases, which improves fuel economy.

The preferred embodiment differs from the conventional power distribution controller in that the determination threshold values for the throttle opening degree is set in accordance with the vehicle speed. Therefore, although the vehicle is in the steady driving state in the high speed range, the ECU 42 correctly determines the steady driving state. Also, the ECU 42 correctly determines the steady driving state even when the vehicle is driving on a gentle slope at high speed.

In the preferred embodiment, the ECU 42 sets the first to third determination threshold values $\lambda 1$, $\lambda 2$, and $\lambda 3$ with reference to the threshold value setting map, which is stored in the ROM in advance. The map indicates the relationship between the vehicle speed and the first to third determination threshold values $\lambda 1$, $\lambda 2$, and $\lambda 3$.

As a result, the first to third determination threshold values $\lambda 1$, $\lambda 2$, and $\lambda 3$ corresponding to the vehicle speed are easily selected.

The distribution ratio of torque to the rear wheels 21 increases faster when the first shift mode is selected as compared to the case when the second shift mode is selected.

As a result, in the first shift mode, the distribution ratio of torque to the rear wheels 21 is increased rapidly in response to the driver's intention.

That is, when it is determined that the throttle opening degree is greater than or equal to the second determination threshold value $\lambda 2$, the throttle opening degree is in the area denoted with 4WD(I) at the upper portion of FIG. 3. In this case, the driver is depressing the acceleration pedal by a large amount. Thus, the distribution ratio of torque to the rear wheels 21 is relatively rapidly increased in accordance with the first shift mode in response to the driver's intention.

If it is determined that the throttle opening degree is less than or equal to the first determination threshold value $\lambda 1$, the throttle opening degree is located in the area denoted with 4WD(I) at the lower portion of FIG. 3. In this case, the throttle opening degree is in the vicinity of 0% indicating that the acceleration pedal is not depressed in the low speed range (60 km/h or less in FIG. 3).

Also, in the middle speed range and high speed range (the speed range that exceeds 60 km/h in FIG. 3), the throttle opening degree is small (depressing degree of acceleration pedal is small). Thus, it is understood that the driver does not intend to increase the throttle opening degree although the vehicle speed is in the middle speed range or high speed range. Therefore, the distribution ratio of torque to the rear wheels 21 is relatively rapidly increased in accordance with the first shift mode in response to the driver's intention.

On the other hand, in the second shift mode, the distribution ratio of torque to the rear wheels 21 is increased automatically and slowly regardless of the driver's intention.

That is, the second shift mode is selected when the throttle opening degree is less than the second determination threshold value λ2 and greater than or equal to the third determination threshold value λ3 (when the throttle opening degree is in the area denoted with 4WD(II) in FIG. 3). In this case, as shown in FIG. 3, the throttle opening degree is relatively large but is smaller than that when the throttle opening degree is located in the area 4WD(I) at the upper portion of FIG. 3. Therefore, when the throttle opening degree is in the area denoted with 4WD(II), it is determined that the driver is depressing the acceleration pedal without intention of rapidly increasing the speed. Thus, the ECU 42 relatively slowly increases the distribution ratio of torque to the rear wheels 21. This prevents the driver to feel uncomfortable while driving the vehicle.

According to the present invention, the ECU 42 determines whether the wheel speed of any of the four wheels is greater than or equal to the fourth determination threshold value (see step S60). The ECU 42 determines whether variation of the wheel speed of four wheels per one second is greater than or equal to the fifth determination threshold value. Further, the ECU 42 determines whether the difference αN between the wheel speed of the front and rear wheels is greater than or equal to the sixth determination threshold value.

The ECU 42 determines the steady driving state based on the above-mentioned determination results regarding the wheel speed and the comparison result between the throttle opening degree and the first to third determination threshold values λ1, λ2, and λ3. As a result, the steady driving state is determined with high accuracy.

It should be apparent to those skilled in the art that the present invention may be embodied in many other specific forms without departing from the spirit or scope of the invention. Particularly, it should be understood that the invention may be embodied in the following forms.

In the preferred embodiment, the determinations in steps S60, S70, and S90 are all performed. However, one or two of the determinations in steps S60, S70, and S90 may be omitted.

In the preferred embodiment, the electromagnetic clutch mechanism 18 is used as a differential control device of the coupling 17. However, other types of devices that vary the transmission torque such as a hydraulic clutch mechanism may be used.

The present invention may be applied to a four-wheel drive vehicle having a center differential as the differential control device.

The present invention may be applied to a four-wheel drive vehicle in which the rear wheels are always driven and the front wheels are driven as required.

The present invention may be applied to not only a four-wheel drive vehicle in which the engine is located at the front of the vehicle but also a four-wheel drive vehicle in which the engine is located at the rear of the vehicle.

In the preferred embodiment, the vehicle speed is calculated based on the wheel speed of the left and right rear wheels. However, a vehicle speed sensor may be provided as vehicle speed detecting means for directly detecting the vehicle speed.

Therefore, the present examples and embodiments are to be considered as illustrative and not restrictive and the invention is not to be limited to the details given herein, but may be modified within the scope and equivalence of the appended claims.

What is claimed is:

1. A power distribution control apparatus for a four-wheel drive vehicle, wherein the vehicle has front wheels and rear wheels driven by an engine, and a coupling for changing the distribution ratio of torque to the front wheels and the rear wheels, wherein the distribution ratio of torque to the front wheels and the rear wheels is determined by the engaging force of the coupling, the apparatus comprising:

vehicle speed detecting means for detecting the speed of the vehicle;

a throttle opening degree sensor for detecting the throttle opening degree, which is the opening degree of a throttle valve located in the engine; and a controller for controlling the coupling, wherein the controller sets at least one determination threshold value for the throttle opening degree in accordance with the detected vehicle speed, wherein the controller determines the driving state of the vehicle by comparing the detected throttle opening degree with the set determination threshold value, and wherein the controller controls the engaging force of the coupling in accordance with the determined driving state.

2. The apparatus according to claim 1, wherein the controller previously stores a map, which indicates the relationship between the vehicle speed and the determination threshold value, and wherein the controller sets the determination threshold value corresponding to the detected vehicle speed based on the map.

3. The apparatus according to claim 1, wherein, when it is determined that the vehicle is in a steady driving state, the controller controls the engaging force of the coupling such that the distribution ratio of torque is biased to either of the front wheels or the rear wheels, and when it is determined that the vehicle is not in the steady driving state, the controller controls the engaging force of the coupling such that the distribution ratio of torque to the front wheels and the rear wheels is changed toward an equalized state.

4. The apparatus according to claim 1, wherein either of the front wheels or the rear wheels are first wheels, which are coupled to the engine without the coupling, and the other of the front wheels or the rear wheels are second wheels, which are coupled to the engine by the coupling.

5. The apparatus according to claim 4, wherein, when it is determined that the vehicle is in a steady driving state, the controller controls the engaging force of the coupling to decrease the distribution ratio of torque to the second wheels, and when it is determined that the vehicle is not in the steady driving state, the controller controls the engaging force of the coupling to increase the distribution ratio of torque to the second wheels.

6. The apparatus according to claim 5, wherein the determination threshold value is one of a plurality of determination threshold values, which include a first determination threshold value and a second determination threshold value, wherein, when compared at the same vehicle speed, the second determination threshold value is greater than the first determination threshold value, and wherein, when the detected throttle opening degree is less than or equal to the first determination threshold value or greater than or equal to the second determination threshold value, the controller determines that the vehicle is not in the steady driving state.

7. The apparatus according to claim 5, wherein the determination threshold value is one of a first determination threshold value, a second determination threshold value, and a third determination threshold value, and wherein, when compared at the same vehicle speed, the third determination threshold value is greater than the first determination threshold value and less than the second determination threshold value, wherein, when the detected throttle opening degree is less than or equal to the first determination threshold value or greater than or equal to the second determination threshold value, the controller determines that the vehicle is not in the steady driving state, and controls the engaging force of the coupling to increase the distribution ratio of torque to the second wheels in accordance with a first shift mode, wherein, when the detected throttle opening degree is less than the second determination threshold value and greater than or equal to the third determination threshold value, the controller determines that the vehicle is not in the steady driving state, and controls the engaging force of the coupling to increase the distribution ratio of torque to the second wheels in accordance with a second shift mode, and wherein the controller increases the distribution ratio of torque to the second wheels at different speed in the first shift mode and the second shift mode.

8. The apparatus according to claim 7, wherein the controller increases the distribution ratio of torque to the second wheels faster in the first shift mode than in the second shift mode.

9. The apparatus according to claim 7, wherein, when the detected throttle opening degree is greater than the first determination threshold value and less than the third determination threshold value for a predetermined time period or more, the controller determines that the vehicle is in the steady driving state.

10. The apparatus according to claim 7, wherein the controller determines whether the vehicle is in the steady driving state based on at least one of the rotation speed of the wheels, variation of the rotation speed of the wheels, and the difference between the rotation speed of the front wheels and the rotation speed of the rear wheels in addition to comparing the detected throttle opening degree with the first to third determination threshold values.

11. A power distribution controlling method for a four-wheel drive vehicle, wherein the vehicle has front wheels and rear wheels driven by an engine, and a coupling for changing the distribution ratio of torque to the front wheels and the rear wheels, wherein the distribution ratio of torque to the front wheels and the rear wheels is determined by the engaging force of the coupling, the method comprising:

detecting the speed of the vehicle;

detecting the throttle opening degree, which is the opening degree of a throttle valve located in the engine;

setting at least one determination threshold value for the throttle opening degree in accordance with the detected vehicle speed;

determining the driving state of the vehicle by comparing the detected throttle opening degree with the set determination threshold value; and controlling the engaging force of the coupling in accordance with the determined driving state.

12. The method according to claim 11, wherein the determination threshold value is set by referring to a map, which indicates the relationship between the vehicle speed and the determination threshold value.

13. The method according to claim 11, wherein either of the front wheels or the rear wheels are first wheels, which are coupled to the engine without the coupling, and the other of the front wheels or the rear wheels are second wheels, which are coupled to the engine by the coupling, the method further comprising:

controlling the engaging force of the coupling to decrease the distribution ratio of torque to the second wheels when it is determined that the vehicle is in a steady driving state; and controlling the engaging force of the coupling to increase the distribution ratio of torque to the second wheels when it is determined that the vehicle is not in the steady driving state.

14. The method according to claim 13, wherein the determination threshold value is one of a plurality of determination threshold values, which include a first determination threshold value and a second determination threshold value, wherein, when compared at the same vehicle speed, the second determination threshold value is greater than the first determination threshold value, and wherein the method includes determining that the vehicle is not in the steady driving state when the detected throttle opening degree is less than or equal to the first determination threshold value or greater than or equal to the second determination threshold value.

15. The method according to claim 13, wherein the determination threshold value is one of a first determination threshold value, a second determination threshold value, and a third determination threshold value, and wherein, when compared at the same vehicle speed, the third determination threshold value is greater than the first determination threshold value and less than the second determination threshold value, the method comprising:

controlling the engaging force of the coupling to increase the distribution ratio of torque to the second wheels in accordance with a first shift mode when the detected throttle opening degree is less than or equal to the first determination threshold value or greater than or equal to the second determination threshold value; and controlling the engaging force of the coupling to increase the distribution ratio of torque to the second wheels in accordance with a second shift mode when the detected throttle opening degree is less than the second determination threshold value and greater than or equal to the third determination threshold value, wherein the distribution ratio of torque to the second wheels is increased at different speed in the first shift mode and the second shift mode.

16. The method according to claim 15, wherein the distribution ratio of torque to the second wheels increases faster in the first shift mode than in the second shift mode.

17. The method according to claim 15, further comprising determining that the vehicle is in the steady driving state when the detected throttle opening degree is greater than the first determination threshold value and less than the third determination threshold value for a predetermined time period or more.

18. The method according to claim 15, further comprising determining whether the vehicle is in the steady driving state based on at least one of the rotation speed of the wheels, variation of the rotation speed of the wheels, and the difference between the rotation speed of the front wheels and the rotation speed of the rear wheels in addition to comparing the detected throttle opening degree with the first to third determination threshold values.

* * * * *